(12) United States Patent
Hai

(10) Patent No.: US 12,443,075 B2
(45) Date of Patent: Oct. 14, 2025

(54) POLARIZER AND DISPLAY DEVICE

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,146

(22) PCT Filed: Mar. 15, 2022

(86) PCT No.: PCT/CN2022/080876
§ 371 (c)(1),
(2) Date: Apr. 21, 2022

(87) PCT Pub. No.: WO2023/168732
PCT Pub. Date: Sep. 14, 2023

(65) Prior Publication Data
US 2024/0272485 A1    Aug. 15, 2024

(30) Foreign Application Priority Data
Mar. 7, 2022   (CN) .......................... 202210215201.8

(51) Int. Cl.
G02F 1/1335    (2006.01)
G02B 5/30      (2006.01)
G02F 1/13363   (2006.01)

(52) U.S. Cl.
CPC ......... *G02F 1/13363* (2013.01); *G02B 5/305* (2013.01); *G02F 1/133528* (2013.01)

(58) Field of Classification Search
CPC .......... G02F 1/13363; G02F 1/133528; G02B 5/305
(Continued)

(56) References Cited

U.S. PATENT DOCUMENTS

2008/0049179 A1* 2/2008 Kawamoto ........ C09K 19/3852
                                                     359/489.02
2020/0271992 A1  8/2020 He
(Continued)

FOREIGN PATENT DOCUMENTS

CN    101055366 A    10/2007
CN    101105548 A    1/2008
(Continued)

OTHER PUBLICATIONS

Chinese Office Action issued in corresponding Chinese Patent Application No. 202210215201.8 dated Apr. 2, 2023, pp. 1-6.
(Continued)

*Primary Examiner* — Christopher M Raabe
(74) *Attorney, Agent, or Firm* — PV IP PC; Christopher S. Ruprecht; Wei Te Chung

(57) ABSTRACT

A polarizer and a display device are provided. In the polarizer, on a basis of using an optical compensation layer to compensate a birefringence of liquid crystal molecules in a liquid crystal layer, a liquid crystal compensation layer is configured to compensate the birefringence of the liquid crystal molecules in the liquid crystal layer. The liquid crystal compensation layer adjusts a compensation value through a refractive index difference and a thickness of the liquid crystal molecules, so an adjustment range is large and a restriction is small, which can be matched with a high phase difference of the display device, and further improves side-view light leakage in a dark state of the liquid crystal display.

20 Claims, 7 Drawing Sheets

(58) Field of Classification Search
USPC .......................................................... 349/119
See application file for complete search history.

(56) References Cited

U.S. PATENT DOCUMENTS

| | | | |
|---|---|---|---|
| 2024/0069264 A1* | 2/2024 | Yoshinari | H05B 33/02 |
| 2024/0280854 A1* | 8/2024 | Kim | G02F 1/133528 |

FOREIGN PATENT DOCUMENTS

| | | | |
|---|---|---|---|
| CN | 101414023 A | | 4/2009 |
| CN | 101416085 A | | 4/2009 |
| CN | 107966846 A | | 4/2018 |
| CN | 114509898 A | | 5/2022 |
| CN | 114545687 A | | 5/2022 |
| CN | 114660853 A | | 6/2022 |
| JP | 2001091744 A | | 4/2001 |
| JP | 2020091423 A | * | 6/2020 |
| TW | 1288282 B | | 10/2007 |

OTHER PUBLICATIONS

Chinese Office Action issued in corresponding Chinese Patent Application No. 202210215201.8 dated Sep. 25, 2023, pp. 1-9.
Chinese Decision of Rejection issued in corresponding Chinese Patent Application No. 202210215201.8 dated Dec. 11, 2023, pp. 1-7.
International Search Report in International application No. PCT/CN2022/080876, mailed on Oct. 26, 2022.
Written Opinion of the International Search Authority in International application No. PCT/CN2022/080876, mailed on Oct. 26, 2022.

* cited by examiner

POLARIZER AND DISPLAY DEVICE

FIELD OF DISCLOSURE

The present disclosure relates to the field of display technologies, in particular to a polarizer and a display device.

BACKGROUND

A side-view contrast ratio of an existing vertical alignment liquid crystal display device is poor, thereby affecting an image quality of the liquid crystal display device. In particular, with the development of high dynamic range image televisions, requirements for a contrast ratio of liquid crystal display devices are higher, and improving the contrast ratio of the liquid crystal display devices is a development trend of the panel industry in the future.

The poor side-view contrast ratio of the existing vertical alignment liquid crystal display device is mainly caused by a side-view light leakage in a dark state. As the viewing angle of a thin film transistor liquid crystal display device increases, the contrast of an image will be continuously reduced, and the clarity of the image will be reduced. This is because a birefringence of liquid crystal molecules in a liquid crystal layer changes with the viewing angle. Using a wide viewing angle compensation film for compensation can effectively reduce the light leakage of a dark image, and can greatly improve the contrast of the image within a certain viewing angle range. A compensation principle of the compensation film is to correct a phase difference generated by the liquid crystal at different viewing angles, so that the birefringence of the liquid crystal molecules can be symmetrically compensated. However, conventional compensation films use optical compensation. The optical compensation realizes an adjustment of a compensation value by stretching the film. Due to the limited stretch of the film, the compensation value is also limited and cannot be matched with the phase difference of the vertical alignment liquid crystal display device. Therefore, an effect of improving the dark side-view light leakage of the vertical alignment liquid crystal display device is limited.

SUMMARY OF DISCLOSURE

The present disclosure provides a polarizer and a display device to solve a problem that an improvement effect of a side-view light leakage of a vertical alignment liquid crystal display device is limited.

The present disclosure provides a polarizer, including:
a first polarizing layer;
a liquid crystal compensation layer; and
an optical compensation layer, where the first polarizing layer, the liquid crystal compensation layer, and the optical compensation layer are stacked, and both the optical compensation layer and the liquid crystal compensation layer are arranged on one side of the first polarizing layer.

Alternatively, in some embodiments of the present disclosure, the liquid crystal compensation layer includes a liquid crystal polymer.

Alternatively, in some embodiments of the present disclosure, a difference in birefringence of liquid crystal molecules in the liquid crystal polymer ranges from 0.05 to 0.15.

Alternatively, in some embodiments of the present disclosure, a thickness of the liquid crystal polymer ranges from 0.01 micrometers to 6 micrometers.

Alternatively, in some embodiments of the present disclosure, the polarizer further includes a first protection layer, and the first protection layer is disposed on a side of the first polarizing layer away from the liquid crystal compensation layer.

Alternatively, in some embodiments of the present disclosure, the first polarizing layer, the liquid crystal compensation layer, and the optical compensation layer are stacked in sequence.

Alternatively, in some embodiments of the present disclosure, the polarizer further includes a first support layer disposed between the first polarizing layer and the liquid crystal compensation layer.

Alternatively, in some embodiments of the present disclosure, the first polarizing layer, the optical compensation layer, and the liquid crystal compensation layer are stacked in sequence.

Alternatively, in some embodiments of the present disclosure, the polarizer further includes a first support layer, and the first support layer is disposed on a side of the liquid crystal compensation layer away from the first polarizing layer.

Correspondingly, the present disclosure also provides a display device, including:
a first polarizer;
a second polarizer opposite to the first polarizer; and
a liquid crystal display panel disposed between the first polarizer and the second polarizer.
The first polarizer includes:
a first polarizing layer;
a liquid crystal compensation layer; and
an optical compensation layer, where the first polarizing layer, the liquid crystal compensation layer, and the optical compensation layer are stacked, and both the optical compensation layer and the liquid crystal compensation layer are arranged on one side of the first polarizing layer; and
the liquid crystal compensation layer and the optical compensation layer are disposed between the first polarizing layer and the liquid crystal display panel.

Alternatively, in some embodiments of the present disclosure, the liquid crystal compensation layer includes a liquid crystal polymer.

Alternatively, in some embodiments of the present disclosure, a difference in birefringence of liquid crystal molecules in the liquid crystal polymer ranges from 0.05 to 0.15.

Alternatively, in some embodiments of the present disclosure, a thickness of the liquid crystal polymer ranges from 0.01 micrometers to 6 micrometers.

Alternatively, in some embodiments of the present disclosure, the polarizer further includes a first protection layer, and the first protection layer is disposed on a side of the first polarizing layer away from the liquid crystal compensation layer.

Alternatively, in some embodiments of the present disclosure, the first polarizing layer, the liquid crystal compensation layer, and the optical compensation layer are stacked in sequence.

Alternatively, in some embodiments of the present disclosure, the polarizer further includes a first support layer disposed between the first polarizing layer and the liquid crystal compensation layer.

Alternatively, in some embodiments of the present disclosure, the first polarizing layer, the optical compensation layer, and the liquid crystal compensation layer are stacked in sequence.

Alternatively, in some embodiments of the present disclosure, the polarizer further includes a first support layer, and the first support layer is disposed on a side of the liquid crystal compensation layer away from the first polarizing layer.

Alternatively, in some embodiments of the present disclosure, the second polarizer includes a second polarizing layer.

Alternatively, in some embodiments of the present disclosure, the second polarizer further includes a second support layer, and the second support layer is disposed between the second polarizing layer and the liquid crystal display panel.

The present disclosure provides a polarizer and a display device. The polarizer includes a first polarizing layer, a liquid crystal compensation layer, and an optical compensation layer. The first polarizing layer, the liquid crystal compensation layer, and the optical compensation layer are stacked, and both the optical compensation layer and the liquid crystal compensation layer are arranged on one side of the first polarizing layer. The polarizer of the present disclosure adopts a structure in which the liquid crystal compensation layer, the optical compensation layer, and the polarizing layer are stacked. The polarizing layer serves as a polarizer to convert an incident light into a linearly polarized light. On a basis of using the optical compensation layer to compensate the birefringence of the liquid crystal molecules in the liquid crystal layer, the liquid crystal compensation layer is configured to compensate the birefringence of the liquid crystal molecules in the liquid crystal layer. The liquid crystal compensation layer does not improve a compensation value by stretching, but adjusts the compensation value by a refractive index difference and a thickness of the liquid crystal molecules. Thus, an adjustment range is large, a restriction is small, and it can be matched with a high phase difference of the display device. Therefore, a side-view light leakage in a dark state of the liquid crystal display is further improved, a contrast ratio of the liquid crystal display is improved, and an image quality is improved. In the display device, the optical compensation layer and the liquid crystal compensation layer are disposed on one polarizer of the display device. The other polarizer of the display device is a conventional polarizer, and the conventional polarizer can be used interchangeably with the polarizers of other types of display panels, thereby helping to reduce material preparation costs and inventory risks.

BRIEF DESCRIPTION OF DRAWINGS

In order to illustrate technical solutions in the embodiments of the present disclosure more clearly, the following briefly introduces accompanying drawings used in the description of the embodiments. Obviously, the drawings in the following description are only some implementations of the present disclosure. For example, for those skilled in the art, other drawings can also be obtained from these drawings without any creative efforts.

DETAILED DESCRIPTION

Figure 1:
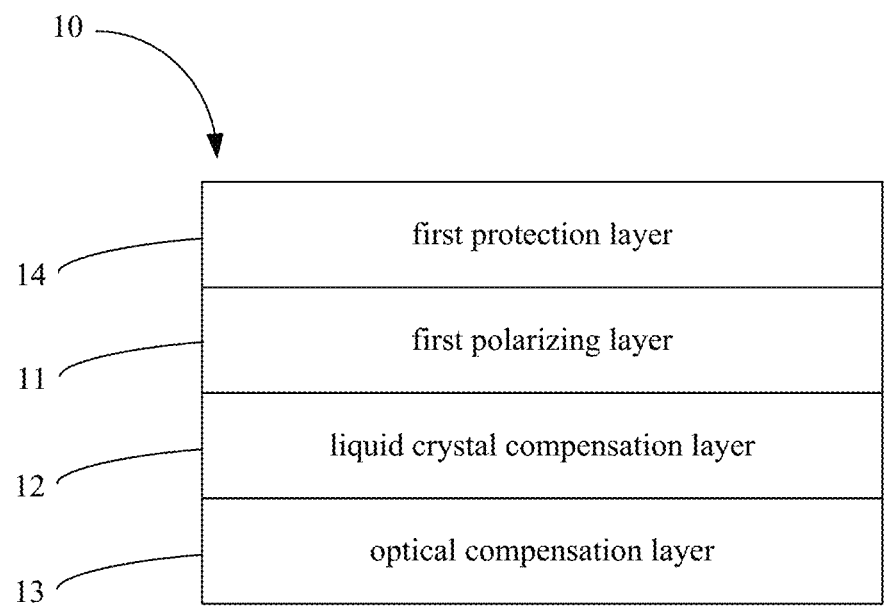
FIG. 1 is a schematic diagram of a first structure of a polarizer of the present disclosure.

The following will clearly and completely describe the technical solutions in the embodiments of the present disclosure with reference to the drawings in the embodiments of the present disclosure. Obviously, the described embodiments are only a part of the embodiments of the present disclosure, but not all embodiments of the present disclosure. Based on the embodiments in the present disclosure, all other embodiments obtained by those skilled in the art without creative efforts shall fall within the protection scope of the present disclosure.

In the description of the present disclosure, it should be understood that, terms such as "up", "down", "front", "rear", "left", "right", "inside", and "outside" indicate an orientation or position relationship based on the orientation or position shown in the accompanying drawings. These terms are merely for the convenience of describing the present disclosure and simplifying the description, and not to indicate or imply that the device or element referred to must have a particular orientation, be constructed and operated in a particular orientation, and therefore cannot be understood as a limitation on the present disclosure. In addition, terms "first" and "second" are merely for description, and cannot be understood to indicate or imply relative importance or to imply a quantity of technical features indicated. Thus, features defined by "first" and "second" may explicitly or implicitly include one or more of these features. In the description of the present invention, "plurality of" means two or more, unless otherwise specifically defined.

A poor side-view contrast ratio of an existing vertical alignment liquid crystal display panel is mainly caused by a side-view light leakage in a dark state. As a viewing angle of a thin film transistor liquid crystal display panel increases, a contrast of an image will decrease continuously, and a clarity of the image will decrease. This is because a birefringence of liquid crystal molecules in a liquid crystal layer changes with the viewing angle. In the present disclosure, on a basis of using an optical compensation layer to compensate a birefringence of liquid crystal molecules in a liquid crystal layer, a liquid crystal compensation layer is configured to compensate the birefringence of the liquid crystal molecules in the liquid crystal layer. The liquid crystal compensation layer adjusts a compensation value by a refractive index difference and a thickness of the liquid crystal molecules. Thus, an adjustment range is large, a restriction is small, and it can be matched with a high phase difference of the display device. Therefore, a side-view light leakage in a dark state of the liquid crystal display is further improved, a contrast ratio of the liquid crystal display is improved, and an image quality is improved.

The present disclosure provides a polarizer and a display device, which are described in detail below. It should be noted that the description order of the following embodiments is not intended to limit the preferred order of the embodiments of the present disclosure.

Referring to FIG. 1, FIG. 1 is a schematic diagram of a first structure of a polarizer 10 of the present disclosure. The present disclosure provides a polarizer 10 that includes a first polarizing layer 11, a liquid crystal compensation layer 12, and an optical compensation layer 13. The first polarizing layer 11, the liquid crystal compensation layer 12, and the optical compensation layer 13 are stacked. Both the optical compensation layer 13 and the liquid crystal compensation layer 12 are arranged on one side of the first polarizing layer 11.

The polarizer of the present disclosure utilizes the optical compensation layer 13 to compensate a birefringence of liquid crystal molecules in a liquid crystal layer. A compensation principle of the optical compensation layer 13 is generally to correct a phase difference generated by the liquid crystal at different viewing angles, so that birefringence properties of the liquid crystal molecules can be symmetrically compensated. The birefringence of the liquid crystal molecules in the liquid crystal layer is compensated by the liquid crystal compensation layer 12. The liquid crystal compensation layer 12 does not improve a compensation value by stretching, adjusts the compensation value by a refractive index difference and a thickness of the liquid crystal molecules. Thus, an adjustment range is large, a restriction is small, and it can be matched with a high phase difference of the display device. Therefore, a side-view light leakage in a dark state of the liquid crystal display panel is further improved, a contrast ratio of the liquid crystal display panel is improved, and an image quality is improved.

The polarizing layer serves as a polarizer to convert an incident light into a linearly polarized light. Material of the first polarizing layer 11 is polyvinyl alcohol film. The polyvinyl alcohol film has characteristics of high temperature and humidity resistance. The temperature and humidity resistance of the polyvinyl alcohol film can be achieved by adjusting a formula of a polyvinyl alcohol iodine solution, a stretching ratio, and a stretching rate to achieve the characteristics of high temperature and humidity resistance. In this way, the whole polarizer has the characteristics of high temperature and humidity resistance. Specifically, steps of determining that the polarizer has characteristics of high temperature and humidity resistance are as follows. For high temperature resistance, a polarizer sample with a size of 40×40 mm is taken, it is attached to a clean glass with a roller, and it is placed in an environment of 80° C.×5 kgf/cm2. After 15 minutes, it is determined whether a high temperature resistance at 80° C. and 500 hours is within specification. For high humidity resistance, a polarizer sample with a size of 40×40 mm is taken, it is attached to a clean glass with a roller, and it is placed it in an environment of 80° C.×5 kgf/cm2 for 15 minutes. It is determined whether humidity resistance at 60° C., 90% RH (humidity), and 500 hours is within specification. It is determined that a change rate of a monomer penetration of the polarizer is less than or equal to 5%.

The liquid crystal compensation layer 12 includes a liquid crystal polymer. Compared with ordinary optoelectronic liquid crystal molecules, in terms of molecular structure, in addition to liquid crystal molecules, the liquid crystal polymer also has one or more reactive functional groups at an end of the liquid crystal molecules. The above-mentioned combination can be photopolymerized into a polymer network, i.e., the liquid crystal polymer is formed. Since most of polymerization initiators used are ultraviolet-sensitive (wavelength 254-365 nm), they are also called ultraviolet-reactive liquid crystals.

Traditional optical films are mostly made of polymers that are uniaxially or biaxially stretched. The original isotropy of the random arrangement of molecular axes will be deflected to anisotropy with an extension direction, so that the traveling speed of incident light in different directions will be different, that is, a phase delay phenomenon, which can be used to adjust or compensate the phase of light.

Generally, a phase retardation can be calculated by multiplying a difference $\Delta n$ of a biaxial refractive index of a film by a thickness d of the film, that is, $R=\Delta nd$. Whether it is rod-shaped or disc-shaped liquid crystal molecules, although an overall anisotropy still depends on an arrangement rule, the birefringence of the liquid crystal is basically about 0.1. The birefringence is ten times or even a hundred times that of traditional polymer stretch films. Therefore, a thickness of the optical film produced by liquid crystal molecules can be very small, which is very suitable for a roll-to-roll coating process.

In some embodiments, the liquid crystal compensation layer 12 is formed by a coating process. General coating methods include wire rod coating, extrusion coating, direct gravure coating, reverse gravure coating, and die coating. Specifically, the coating process is as follows. A layer of an alignment film is formed on a substrate, the alignment film is subjected to a rubbing alignment treatment, and then the liquid crystal polymer is coated on the alignment film for alignment.

In addition, the formation process of the liquid crystal compensation layer 12 may also be as follows. The liquid crystal polymer is formed on the substrate, and then the liquid crystal polymer is cured and aligned by ultraviolet light. The process is quite simple and fast.

In some embodiments, a difference in birefringence of the liquid crystal molecules in the liquid crystal polymer ranges from 0.05 to 0.15. The high birefringence difference of liquid crystal molecules can have a better compensation performance under the same thickness, so that the thickness of the liquid crystal polymer can be effectively reduced and the thickness of the display panel can be reduced.

In some embodiments, the thickness of the liquid crystal polymer ranges from 0.01 micrometers and 6 micrometers. The thickness of the liquid crystal polymer can be set according to characteristics of the specific liquid crystal display panel. By adjusting the thickness of the liquid crystal polymer, the birefringence of the liquid crystal molecules of the liquid crystal layer of the display panel can be completely compensated.

In general, a compensation principle of the optical compensation layer 13 is to correct the phase difference of the liquid crystal at different viewing angles, so that the birefringence properties of the liquid crystal molecules are compensated by symmetry. The optical compensation layer 13 includes a single optical axis compensation film or a dual optical axis compensation film. The single optical axis compensation film is an anisotropic birefringent film with only one optical axis. The dual optical axis compensation film has two optical axes and three refractive indices. The dual optical axis compensation film has an in-plane retardation value Ro and an out-of-plane retardation value Rth in a thickness direction.

Additionally, in some embodiments, the polarizer further includes a first protection layer 14. The first protection layer 14 is disposed on a side of the first polarizing layer 11 away from the liquid crystal compensation layer 12. Moreover, material of the first protection layer 14 is any one of cellulose triacetate, polymethyl methacrylate, and polyethylene glycol terephthalate. The first protection layer 14 serves as a protection layer of the first polarizing layer 11, which has functions of isolating water vapor, and can also serves as a support for the entire polarizer.

In some embodiments, the first polarizing layer 11, the liquid crystal compensation layer 12, and the optical compensation layer 13 are stacked in sequence.

Figure 2:
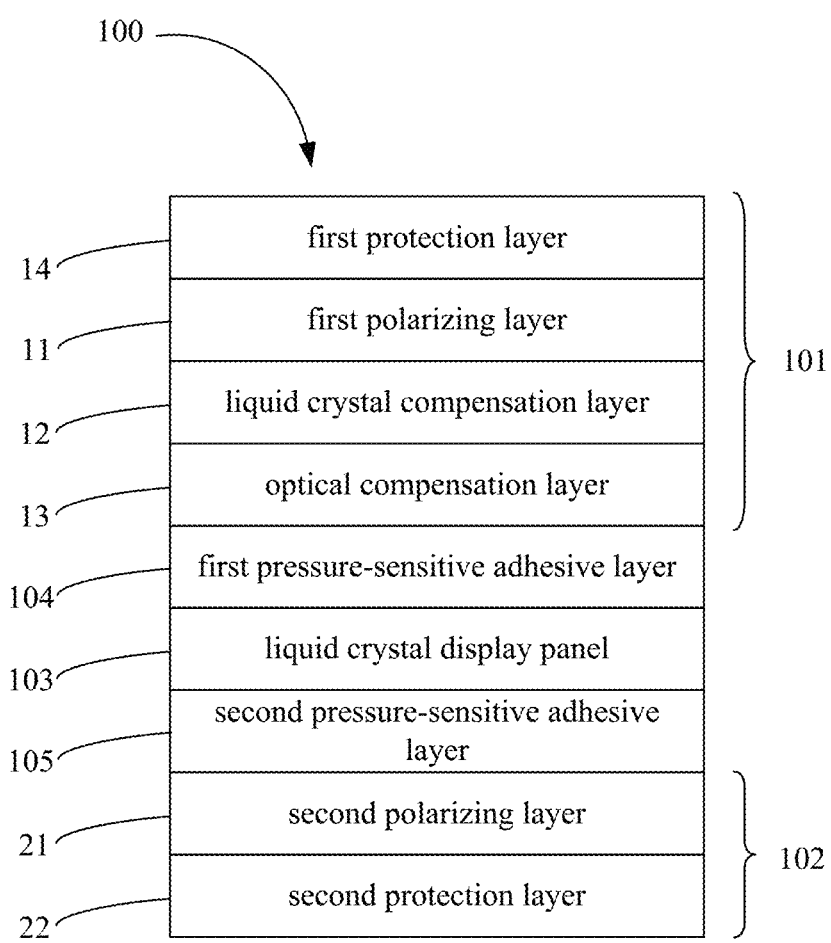
FIG. 2 is a schematic diagram of the first structure of a display device of the present disclosure.

Referring to FIG. 2, FIG. 2 is a schematic diagram of the first structure of a display device of the present disclosure. The present disclosure also provides a display device 100 including a first polarizer 101, a second polarizer 102, and a liquid crystal display panel 103. The second polarizer 102 and the first polarizer 101 are arranged opposite to each other. The liquid crystal display panel 103 is disposed between the first polarizer 101 and the second polarizer 102.

The first polarizer 101 includes the polarizer described above. The liquid crystal compensation layer 12 and the optical compensation layer 13 are disposed between the first polarizing layer 11 and the liquid crystal display panel 103. Specifically, the optical compensation layer 13 is disposed between the liquid crystal compensation layer 12 and the liquid crystal display panel 103.

It can be understood that the liquid crystal display panel 103 includes a light incident side and a light exit side. In this embodiment, the first polarizer 101 may be used as the light incident side, and the second polarizer 102 may be used as the light exit side. Alternatively, the second polarizer 102 can also be used as the light incident side, and the first polarizer 101 can be used as the light exit side, which is not limited in the present disclosure.

An absorption axis of the first polarizer 101 is set at a first angle. An absorption axis of the second polarizer 102 is set at a second angle. The first angle is one of 90 degrees and 0 degrees, and the second angle is the other of 90 degrees and 0 degrees.

Referring to FIG. 2, it can be understood that the display device 100 includes an upper polarizer and a lower polarizer. The first polarizer 101 is the upper polarizer or the lower polarizer. The second polarizer 102 is the lower polarizer or the upper polarizer. Specifically, in this embodiment, the first polarizer 101 is the upper polarizer, and the second polarizer 102 is the lower polarizer.

The present disclosure uses the optical compensation layer 13 on one side of the first polarizer 101 to compensate for birefringence of liquid crystal molecules in the liquid crystal layer. The compensation principle of the optical compensation layer 13 is generally to correct the phase difference generated by the liquid crystal at different viewing angles, so that the birefringence properties of the liquid crystal molecules can be symmetrically compensated. By using the liquid crystal compensation layer 12 to compensate the birefringence of the liquid crystal molecules in the liquid crystal layer, the liquid crystal compensation layer 12 does not improve the compensation value by stretching, but adjusts the compensation value by the refractive index difference and the thickness of the liquid crystal molecules. Therefore, the adjustment range is large and the restriction is small, which can be matched with the high phase difference of the liquid crystal display panel 103. Therefore, the side-view light leakage of the liquid crystal display panel 103 in a dark state is further improved, the contrast ratio of the liquid crystal display panel 103 is improved, and the image quality is improved.

Figure 3:
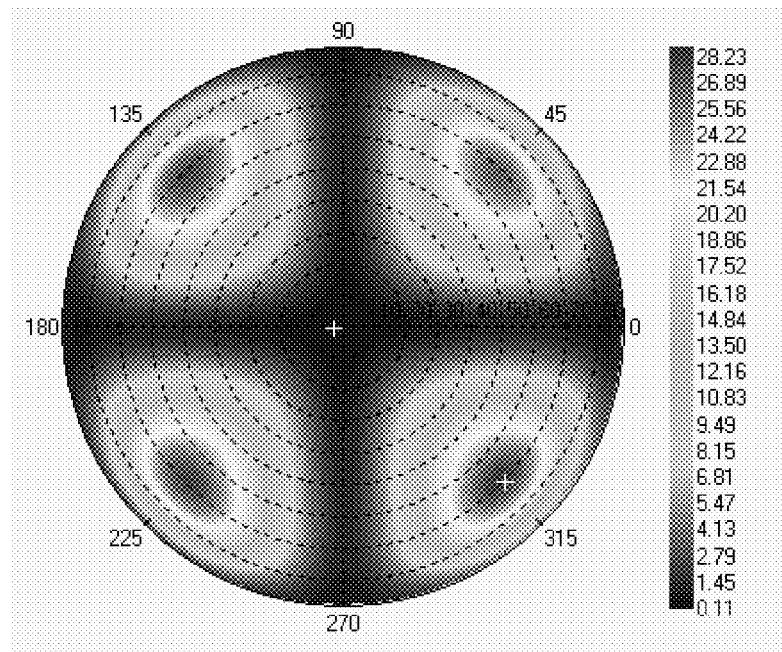
FIG. 3 is a light leakage effect diagram of an existing display device in a dark state.
Figure 4:
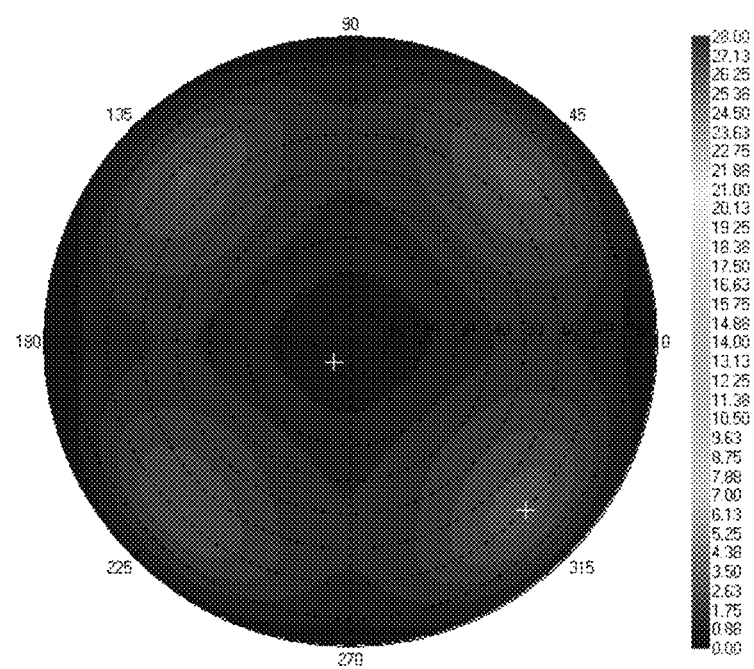
FIG. 4 is a light leakage effect diagram of a display device in a dark state of the present disclosure.

Referring to FIG. 3 and FIG. 4, FIG. 3 is a light leakage effect diagram of an existing display device in a dark state, and FIG. 4 is a light leakage effect diagram of a display device in a dark state of the present disclosure. Referring to an effect comparison table below, through the comparison, a maximum light leakage of the existing display device in the dark state is 28 nits, and a maximum light leakage of the display device of the present disclosure in the dark state is 2.3 nits. Therefore, the present disclosure can greatly improve the light leakage in the dark state of the liquid crystal display, improve the contrast ratio of the liquid crystal display, and improve the image quality.

| Effect Comparison Table | | |
| --- | --- | --- |
| | existing display device | display device of the present disclosure |
| maximum light leakage in a dark state | 28 nits | 2.3 nits |

In the present disclosure, the optical compensation layer 13 and the liquid crystal compensation layer 12 are provided on the same side. That is, the optical compensation layer 13 and the liquid crystal compensation layer 12 are arranged on one polarizer of the display device 100. The other polarizer of the display device 100 is a conventional polarizer, which does not need to be compensated, and is beneficial to reduce product cost. The conventional polarizer can be used interchangeably with polarizers of other types of display panels, which helps to reduce material preparation costs and inventory risks.

In some embodiments, the second polarizer 102 includes a second polarizing layer 21. The polarizing layer serves as a polarizer to convert the incident light into the linearly polarized light. Material of the second polarizing layer 21 is polyvinyl alcohol film. The polyvinyl alcohol film has characteristics of high temperature and humidity resistance. The temperature and humidity resistance of the polyvinyl alcohol film can be achieved by adjusting a formula of a polyvinyl alcohol iodine solution, a stretching ratio, and a stretching rate to achieve the characteristics of high temperature and humidity resistance. In this way, the whole polarizer has the characteristics of high temperature and humidity resistance. Specifically, steps of determining that the polarizer has characteristics of high temperature and humidity resistance are as follows. For high temperature resistance, a polarizer sample with a size of 40×40 mm is taken, it is attached to a clean glass with a roller, and it is placed in an environment of 80° C.×5 kgf/cm2. After 15 minutes, it is determined whether a high temperature resistance at 80° C. and 500 hours is within specification. For high humidity resistance, a polarizer sample with a size of 40×40 mm is taken, it is attached to a clean glass with a roller, and it is placed it in an environment of 80° C.×5 kgf/cm2 for 15 minutes. It is determined whether humidity resistance at 60° C., 90% RH (humidity), and 500 hours is within specification. It is determined that a change rate of a monomer penetration of the polarizer is less than or equal to 5%.

Furthermore, in some embodiments, the second polarizer 102 further includes a second protection layer 22. The second protection layer 22 is disposed on a side of the second polarizing layer 21 away from the liquid crystal display panel 103. Material of the second protection layer 22 is any one of cellulose triacetate, polymethyl methacrylate, and polyethylene glycol terephthalate. The second protection layer 22 serves as a protective layer of the second polarizing layer 21, which has a function of isolating water vapor, and can also serve as a support for the entire polarizer.

Furthermore, in some embodiments, the liquid crystal display panel 103 further includes a first pressure-sensitive adhesive layer 104 and a second pressure-sensitive adhesive layer 105. The first pressure-sensitive adhesive layer 104 is attached to a side of a vertical alignment liquid crystal cell close to the first polarizer 101. The second pressure-sensitive adhesive layer 105 is attached to a side of the vertical alignment liquid crystal cell close to the second polarizer 102. A good fixing performance can be achieved in a short time by applying a slight pressure to the pressure-sensitive adhesive by providing a pressure-sensitive adhesive layer as the adhesive between the vertical alignment liquid crystal cell and other layers. Advantages are that it can quickly wet a contact surface like a fluid, and when peeled off, and it can prevent peeling like a solid. It should be noted that, as another embodiment of the present disclosure, the pressure-sensitive adhesive may not be included. The first pressure-sensitive adhesive layer 104 and the second pressure-sensitive adhesive layer 105 are both polypropylene-based adhesives.

Figure 5:
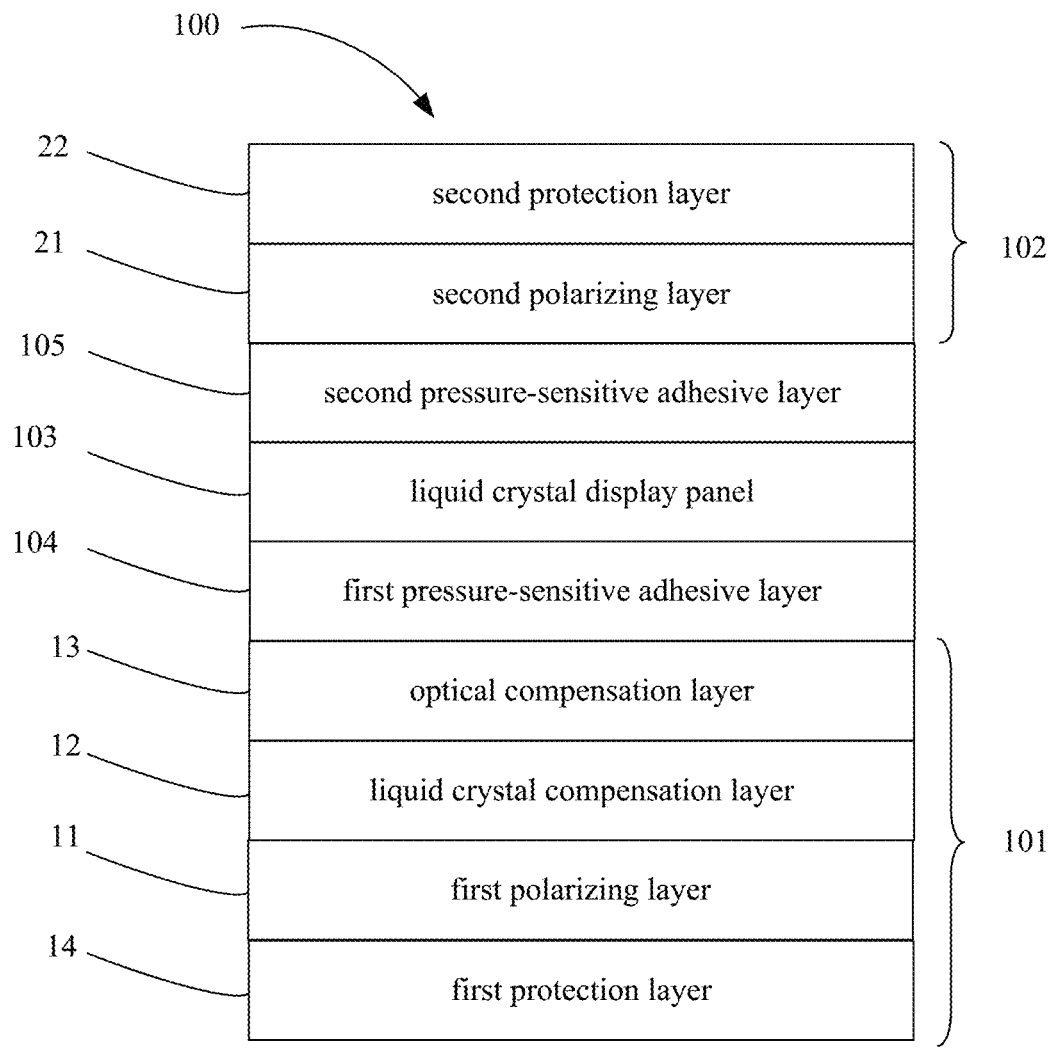
FIG. 5 is a schematic diagram of a second structure of a display device of the present disclosure.

Referring to FIG. 5, FIG. 5 is a schematic diagram of a second structure of a display device of the present disclosure. A difference between this embodiment and the display device 100 of FIG. 2 is that the display device 100 includes an upper polarizer and a lower polarizer. The first polarizer 101 is the lower polarizer, and the second polarizer 102 is the upper polarizer.

Figure 6:
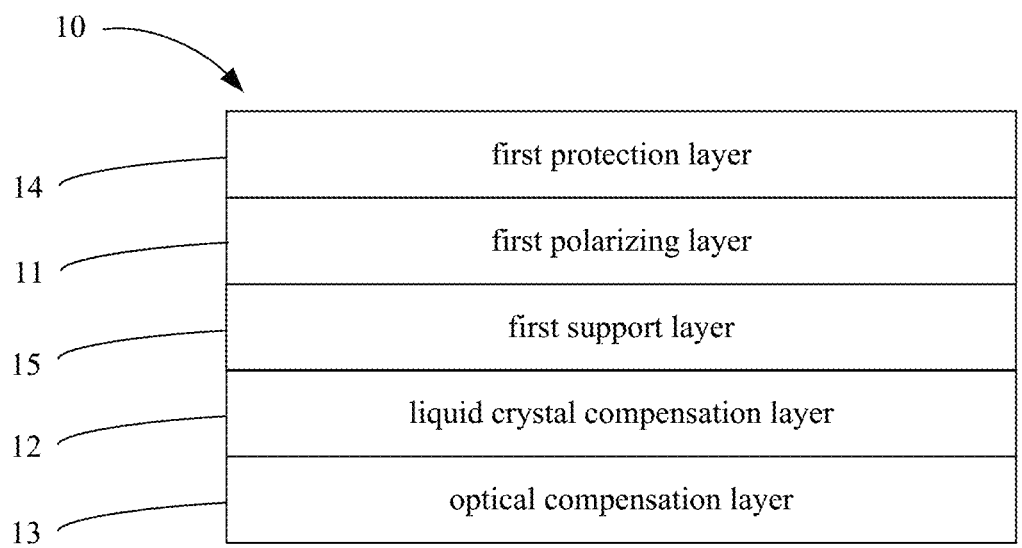
FIG. 6 is a schematic diagram of the second structure of a polarizer of the present disclosure.

Referring to FIG. 6, FIG. 6 is a schematic diagram of the second structure of a polarizer of the present disclosure. A difference between this embodiment and the polarizer 10 of FIG. 1 is that the polarizer 10 also includes a first support layer 15. The first support layer 15 is disposed between the first polarizing layer 11 and the liquid crystal compensation layer 12. The first support layer 15 is configured to protect and support the first polarizing layer 11 and prevent the first polarizing layer 11 from shrinking. The first support layer 15 is a cellulose triacetate film. The cellulose triacetate film has functions of isolating water vapor and supporting due to its high water resistance, low thermal shrinkage, and high durability. Therefore, the first support layer 15 can protect and support the first polarizing layer 11 and prevent the first polarizing layer 11 from shrinking. Moreover, since the first support layer 15 is a non-compensation layer, it does not need to be processed by a special process, and the manufacturing cost is low.

Figure 7:
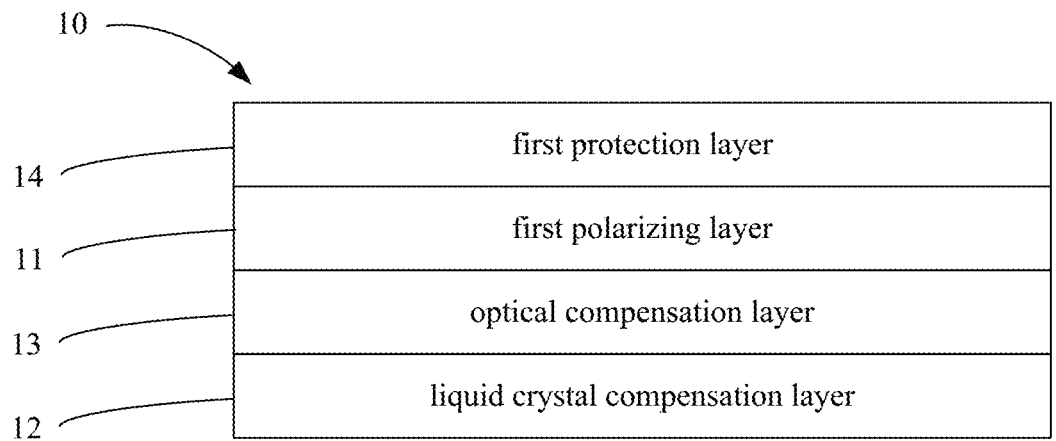
FIG. 7 is a schematic diagram of a third structure of a polarizer of the present disclosure.

Referring to FIG. 7, FIG. 7 is a schematic diagram of a third structure of a polarizer of the present disclosure. A difference between this embodiment and the polarizer 10 of FIG. 1 is that the first polarizing layer 11, the optical compensation layer 13, and the liquid crystal compensation layer 12 are stacked in sequence.

The optical compensation layer 13 can protect and support the first polarizing layer 11. Therefore, there is no need to provide a support layer between the first polarizing layer 11 and the optical compensation layer 13, thereby reducing the cost.

Figure 8:
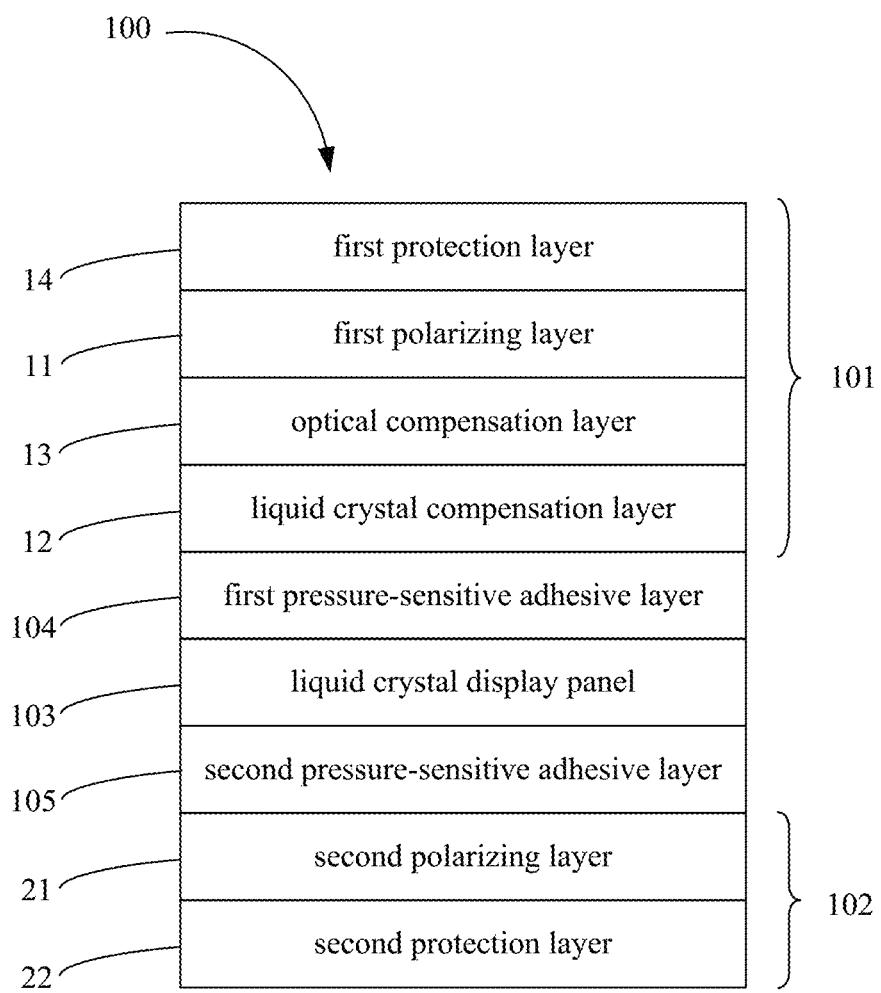
FIG. 8 is a schematic diagram of the third structure of a display device of the present disclosure.

Referring to FIG. 8, FIG. 8 is a schematic diagram of the third structure of a display device 100 of the present disclosure. The present disclosure also provides a display device 100 including a first polarizer 101, a second polarizer 102, and a liquid crystal display panel 103. The second polarizer 102 and the first polarizer 101 are arranged opposite to each other. The liquid crystal display panel 103 is disposed between the first polarizer 101 and the second polarizer 102.

The first polarizer 101 includes the above-described polarizer 10. The liquid crystal compensation layer 12 and the optical compensation layer 13 are disposed between the first polarizing layer 11 and the liquid crystal display panel 103. Specifically, the first polarizing layer 11, the optical compensation layer 13, and the liquid crystal compensation layer 12 are stacked in sequence.

In this embodiment, the display device 100 includes an upper polarizer and a lower polarizer. The first polarizer 101 is the upper polarizer, and the second polarizer 102 is the lower polarizer.

Figure 9:
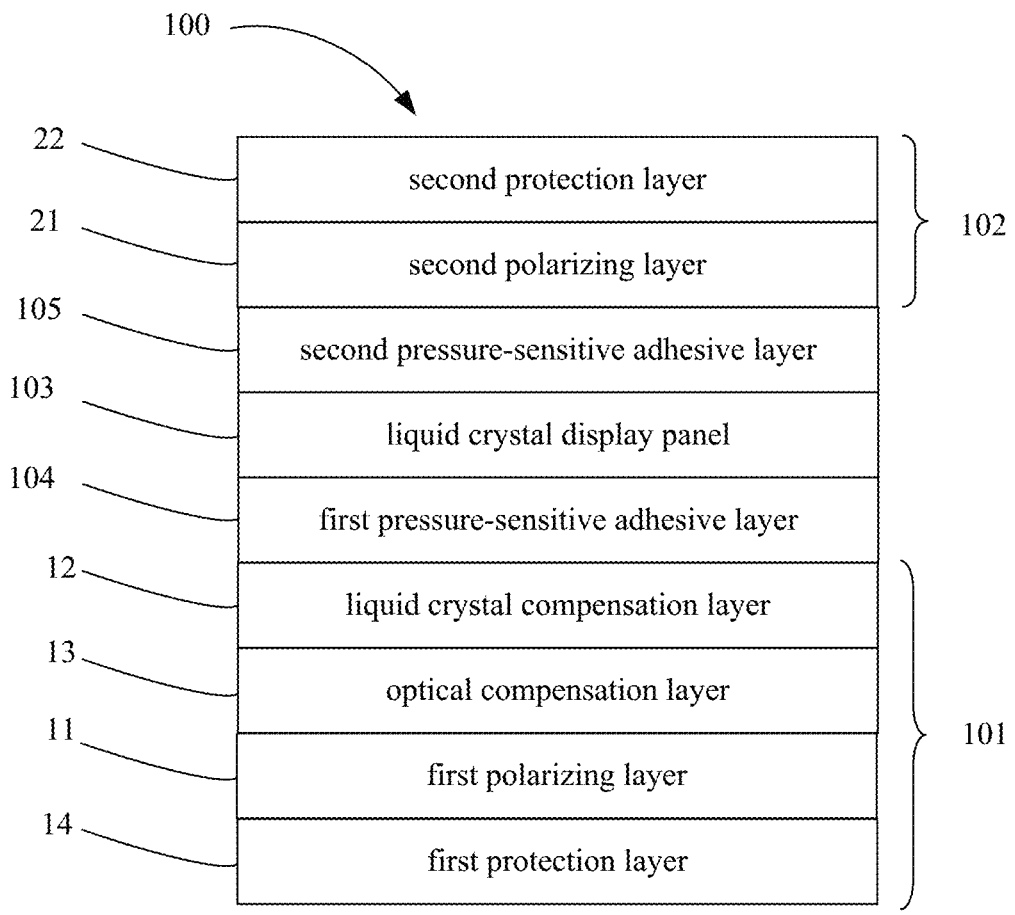
FIG. 9 is a schematic diagram of a fourth structure of a display device of the present disclosure.

Referring to FIG. 9, FIG. 9 is a schematic diagram of a fourth structure of a display device of the present disclosure. A difference between this embodiment and the display device 100 of FIG. 8 is that the display device 100 includes an upper polarizer and a lower polarizer. The first polarizer 101 is the lower polarizer, and the second polarizer 102 is the upper polarizer.

Figure 10:
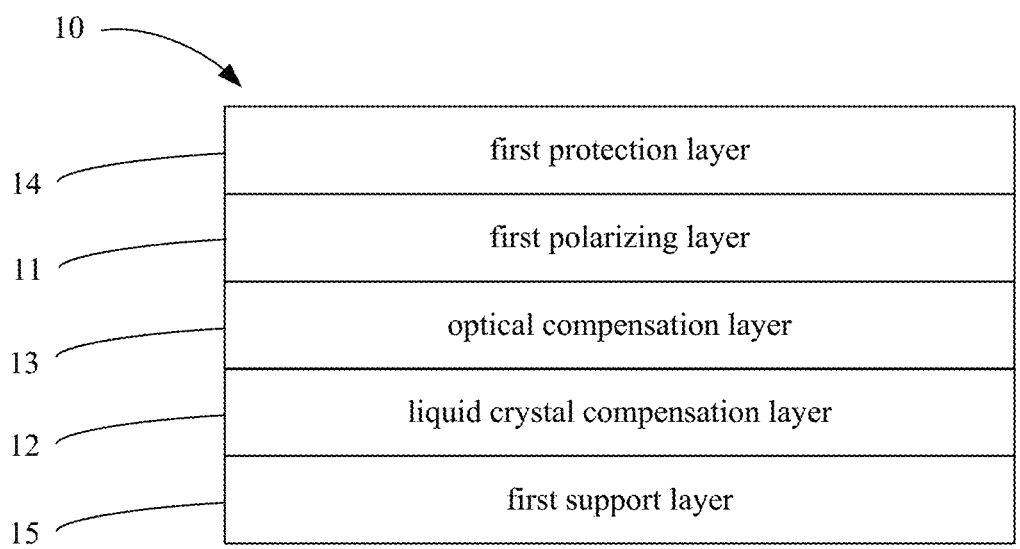
FIG. 10 is a schematic diagram of the fourth structure of a polarizer of the present disclosure.

Referring to FIG. 10, FIG. 10 is a schematic diagram of the fourth structure of a polarizer of the present disclosure. A difference between this embodiment and the polarizer 10 of FIG. 7 is that the polarizer 10 also includes a first support layer 15. The first support layer 15 is disposed on a side of the liquid crystal compensation layer 12 away from the first polarizing layer 11.

The first support layer 15 is configured to protect and support the liquid crystal compensation layer 12 and prevent the liquid crystal compensation layer 12 from shrinking. The first support layer 15 is a cellulose triacetate film. The cellulose triacetate film has functions of isolating water vapor and supporting due to its high water resistance, low thermal shrinkage, and high durability. Therefore, the first support layer 15 can protect and support the liquid crystal compensation layer 12 and prevent the liquid crystal compensation layer 12 from shrinking. Moreover, since the first support layer 15 is a non-compensation layer, it does not need to be processed by a special process, and the manufacturing cost is low.

Figure 11:
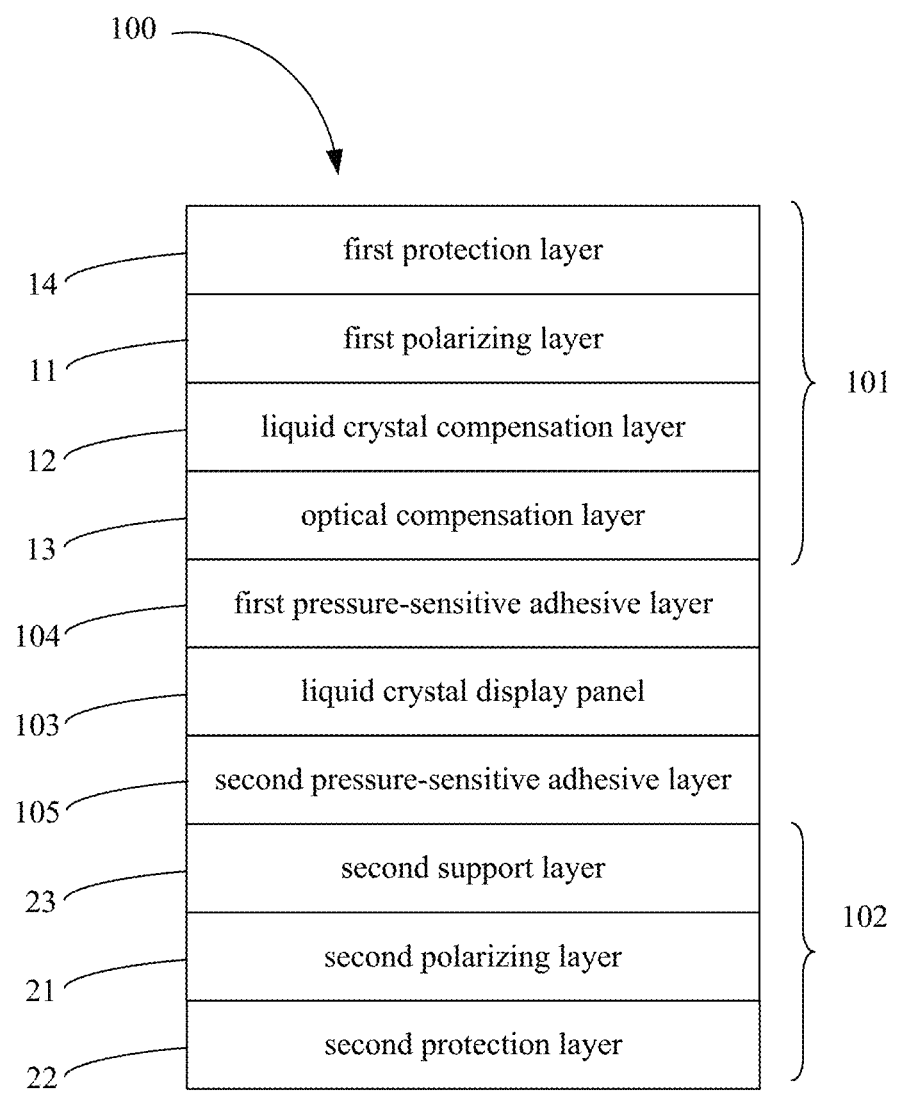
FIG. 11 is a schematic diagram of a fifth structure of a display device of the present disclosure.

Referring to FIG. 11, FIG. 11 is a schematic diagram of a fifth structure of a display device 100 of the present disclosure. A difference between this embodiment and the display device 100 of FIG. 2 is that the second polarizer 102 also includes a second support layer 23. The second support layer 23 is disposed between the second polarizing layer 21 and the liquid crystal display panel 103.

The second support layer 23 is configured to protect and support the second polarizing layer 21 and prevent the second polarizing layer 21 from shrinking. The second support layer 23 is a cellulose triacetate film. The cellulose triacetate film has functions of isolating water vapor and supporting due to its high water resistance, low thermal shrinkage, and high durability. Therefore, the second support layer 23 can protect and support the second polarizing layer 21 and prevent the second polarizing layer 21 from shrinking. Moreover, since the second support layer 23 is a non-compensation layer, it does not need to be processed by a special process, and the manufacturing cost is low.

In this embodiment, the display device 100 includes an upper polarizer and a lower polarizer, the first polarizer 101 is the upper polarizer, and the second polarizer 102 is the lower polarizer.

Figure 12:
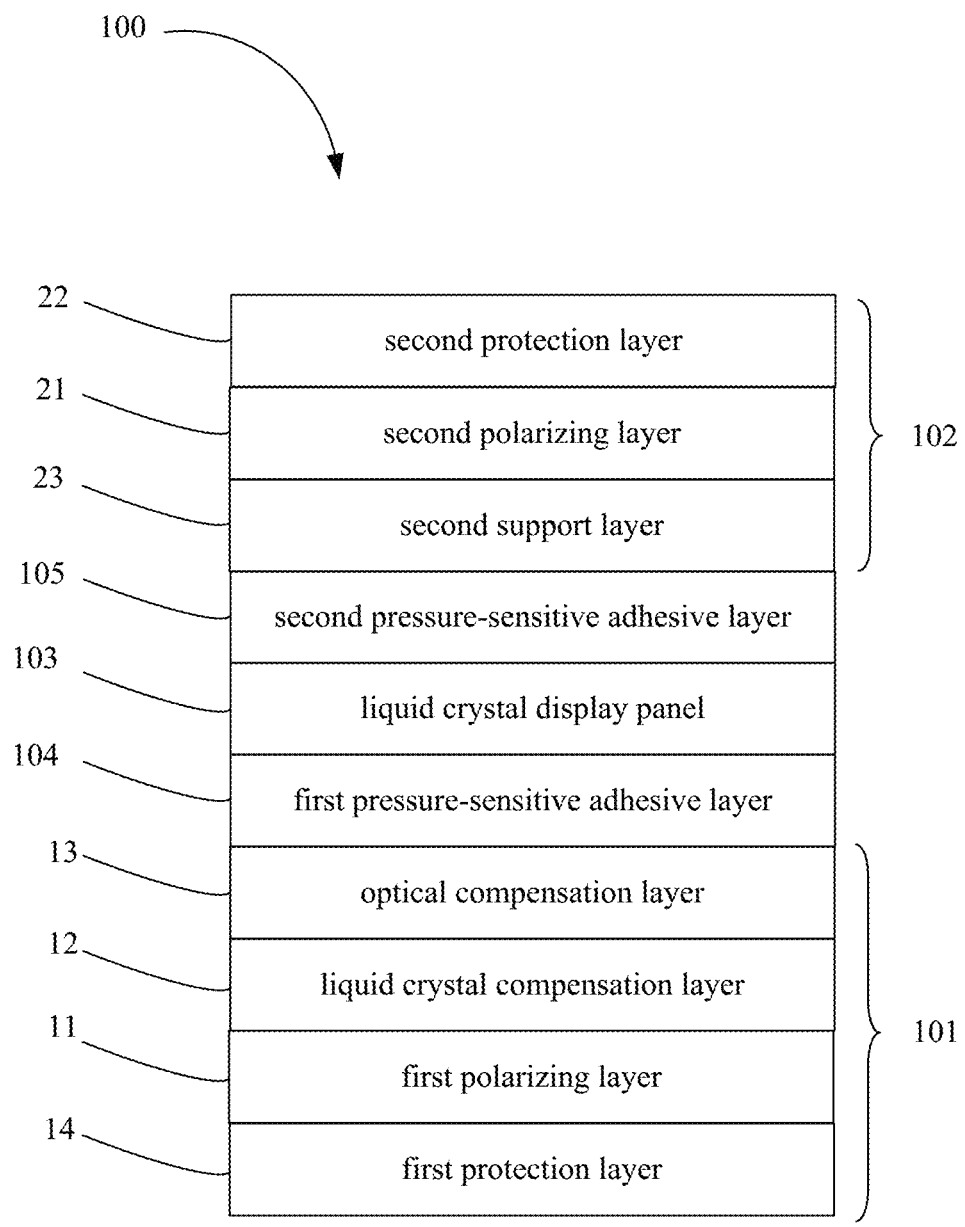
FIG. 12 is a schematic diagram of a sixth structure of a display device of the present disclosure.

Referring to FIG. 12, FIG. 12 is a schematic diagram of a sixth structure of a display device of the present disclosure. A difference between this embodiment and the display device 100 of FIG. 11 is that the display device 100 includes an upper polarizer and a lower polarizer, so the first polarizer 101 is the lower polarizer, and the second polarizer 102 is the upper polarizer.

The display panel of the embodiments of the present disclosure has been introduced in detail above. The principles and implementations of the present disclosure are explained with specific examples in this specification. The descriptions of the above embodiments are only used to help understand the method and the core idea of the present disclosure. Meanwhile, for those skilled in the art, according to the idea of the present disclosure, there will be changes in the specific implementation manner and application scope. In conclusion, the content of this specification should not be construed as a limitation on the present disclosure.

What is claimed is:

1. A polarizer, comprising:
a first polarizing layer;
a liquid crystal compensation layer;
an optical compensation layer, wherein the first polarizing layer, the optical compensation layer, and the liquid crystal compensation layer are stacked in sequence, and both the optical compensation layer and the liquid crystal compensation layer are arranged on one side of the first polarizing layer; and
a first support layer disposed on a side of the liquid crystal compensation layer away from the first polarizing layer, wherein the liquid crystal compensation layer is disposed between the optical compensation layer and the first support layer.

2. The polarizer according to claim 1, wherein the liquid crystal compensation layer comprises a liquid crystal polymer.

3. The polarizer according to claim 2, wherein a difference in birefringence of liquid crystal molecules in the liquid crystal polymer ranges from 0.05 to 0.15.

4. The polarizer according to claim 2, wherein a thickness of the liquid crystal polymer ranges from 0.01 micrometers to 6 micrometers.

5. The polarizer according to claim 1, wherein the polarizer further comprises a first protection layer, and the first protection layer is disposed on a side of the first polarizing layer away from the liquid crystal compensation layer.

6. The polarizer according to claim 1, wherein the optical compensation layer comprises a single optical axis compensation film or a dual optical axis compensation film.

7. The polarizer according to claim 6, wherein the single optical axis compensation film is an anisotropic birefringent film with only one optical axis,
wherein the dual optical axis compensation film has two optical axes and three refractive indices, and
wherein the dual optical axis compensation film has an in-plane retardation value and an out-of-plane retardation value in a thickness direction.

8. A display device, comprising:
a first polarizer;
a second polarizer opposite to the first polarizer; and
a liquid crystal display panel disposed between the first polarizer and the second polarizer, wherein the first polarizer comprises:
a first polarizing layer;
a liquid crystal compensation layer;
an optical compensation layer, wherein the first polarizing layer, the optical compensation layer, and the liquid crystal compensation layer are stacked in sequence, and both the optical compensation layer and the liquid crystal compensation layer are arranged on one side of the first polarizing layer; and
a first support layer disposed on a side of the liquid crystal compensation layer away from the first polarizing layer, wherein the liquid crystal compensation layer is disposed between the optical compensation layer and the first support layer;
wherein the liquid crystal compensation layer and the optical compensation layer are disposed between the first polarizing layer and the liquid crystal display panel.

9. The display device according to claim 8, wherein the liquid crystal compensation layer comprises a liquid crystal polymer.

10. The display device according to claim 9, wherein a difference in birefringence of liquid crystal molecules in the liquid crystal polymer ranges from 0.05 to 0.15.

11. The display device according to claim 9, wherein a thickness of the liquid crystal polymer ranges from 0.01 micrometers to 6 micrometers.

12. The display device according to claim 8, wherein the polarizer further comprises a first protection layer, and the first protection layer is disposed on a side of the first polarizing layer away from the liquid crystal compensation layer.

13. The display device according to claim 8, wherein the optical compensation layer comprises a single optical axis compensation film or a dual optical axis compensation film.

14. The display device according to claim 13, wherein the single optical axis compensation film is an anisotropic birefringent film with only one optical axis,
wherein the dual optical axis compensation film has two optical axes and three refractive indices, and
wherein the dual optical axis compensation film has an in-plane retardation value and an out-of-plane retardation value in a thickness direction.

15. The display device according to claim 8, wherein the second polarizer comprises a second polarizing layer.

16. The display device according to claim 15, wherein the second polarizer further comprises a second support layer, and the second support layer is disposed between the second polarizing layer and the liquid crystal display panel.

17. The polarizer according to claim 1, wherein the first support layer is a cellulose triacetate film.

18. The display device according to claim 8, wherein the first support layer is a cellulose triacetate film.

19. The display device according to claim 8, wherein the second polarizer comprises a second polarizing layer and a second support layer, and the second support layer is disposed between the second polarizing layer and the liquid crystal display panel, wherein the second support layer is a cellulose triacetate film.

20. The display device according to claim 8, wherein the first polarizer is an upper polarizer, and the second polarizer is a lower polarizer.

* * * * *